United States Patent
Yang (10) Patent No.: US 11,524,273 B1
(45) Date of Patent: Dec. 13, 2022

(54) NATURAL ZEOLITE BLOCK FOR IMPROVING WATER QUALITY AND METHOD FOR MANUFACTURING SAME

(71) Applicant: HANDUK INTERNATIONAL CO., LTD, Daegu-si (KR)

(72) Inventor: Jeong Kwon Yang, Daegu-si (KR)

(73) Assignee: HANDUK INTERNATIONAL CO., LTD, Daegu-si (KR)

( * ) Notice: Subject to any disclaimer, the term of this patent is extended or adjusted under 35 U.S.C. 154(b) by 0 days.

(21) Appl. No.: 17/847,346

(22) Filed: Jun. 23, 2022

(30) Foreign Application Priority Data

Dec. 27, 2021 (KR) ........................ 10-2021-0187935

(51) Int. Cl.
| | | |
|---|---|---|
| *B01J 20/16* | (2006.01) | |
| *B01J 20/12* | (2006.01) | |
| *B01J 20/28* | (2006.01) | |
| *B01J 20/30* | (2006.01) | |
| *C02F 1/28* | (2006.01) | |
| *C02F 103/00* | (2006.01) | |

(52) U.S. Cl.
CPC ............ *B01J 20/165* (2013.01); *B01J 20/12* (2013.01); *B01J 20/2803* (2013.01); *B01J 20/28004* (2013.01); *B01J 20/28042* (2013.01); *B01J 20/3007* (2013.01); *B01J 20/3035* (2013.01); *B01J 20/3042* (2013.01); *C02F 1/281* (2013.01); *C02F 2103/007* (2013.01)

(58) Field of Classification Search
CPC . B01J 20/16; B01J 20/165; B01J 20/12; B01J 20/28004; B01J 20/2803; B01J 20/28042; B01J 20/3007; B01J 20/3035; B01J 20/3042; C02F 1/281; C02F 2103/007
USPC .......................................................... 502/67
See application file for complete search history.

(56) References Cited

FOREIGN PATENT DOCUMENTS

| | | |
|---|---|---|
| JP | 2006-281146 A | 10/2006 |
| JP | 2018-008180 A | 1/2018 |
| KR | 10-1959348 B1 | 7/2019 |

*Primary Examiner* — Edward M Johnson
(74) *Attorney, Agent, or Firm* — Novick, Kim & Lee PLLC; Jae Youn Kim

(57) ABSTRACT

A natural zeolite block for improving water quality that is capable of being built in rivers, streams, and reservoirs having point and non-point pollutant sources to purify the water polluted by pollutants, to remove the eutrophication in the water to prevent the occurrence of green and red tides, and to consistently purify heavy metals and all kinds of harmful substances flowing into the water and to a method for manufacturing the same.

1 Claim, 15 Drawing Sheets

NATURAL ZEOLITE BLOCK FOR IMPROVING WATER QUALITY AND METHOD FOR MANUFACTURING SAME

CROSS REFERENCE TO RELATED APPLICATION OF THE INVENTION

The present application claims the benefit of Korean Patent Application No. 10-2021-0187935 filed in the Korean Intellectual Property Office on Dec. 27, 2021, the entire contents of which are incorporated herein by reference.

BACKGROUND OF THE INVENTION

Field of the Invention

The present invention relates to a natural zeolite block for improving water quality that is capable of being built in rivers, streams, and reservoirs having point and non-point pollutant sources to purify the water polluted by pollutants, to remove the eutrophication in the water to prevent the occurrence of green and red tides, and to consistently purify heavy metals and all kinds of harmful substances flowing into the water and to a method for manufacturing the same.

A zeolite as a natural mineral is adopted to achieve objects of the present invention.

The natural zeolite is a microporous mineral that occurs naturally by the solidification of volcanic lava, and it is found in Mongolia, New Zealand, on Youngil and Gampo in Korea, etc.

The natural zeolite is desirably a silicon zeolite-based mineral having positive ion surface charges, and the silicon zeolite has antibacterial activities through positive ion exchange, thereby making it possible to have bacteriostatic activities. Further, the silicon zeolite has strong adsorptive characteristics to thus attach underwater pollutants thereto, thereby purifying the water, and it attaches a variety of suspended solids in large quantities thereto to prevent the occurrence of green and red tides.

Further, the natural zeolite serves to suppress nutritive salts and heavy metals from being dissolved from sediments, thereby preventing water pollution.

Accordingly, the natural zeolite according to the present invention is made by mixing clinoptilolite not heated and mordenite or illite or by mixing clinoptilolite, mordenite, and illite, and while the particles sizes of the mixture are being limited to avoid the use of sand, the mixture is molded by addition of cement and water, thereby manufacturing a zeolite block for improving water quality.

The clinoptilolite may be exchanged to positive ions according to conditions to thus perform positive ion exchange with metal ions having high antibacterial effectiveness, such as Ag, Cu, and Zn, thereby exhibiting high antibacterial activities stably and consistently. The mordenite is porous to exhibit high adsorption capacity, thereby being excellent in removing volatile organic compounds, and the illite is excellent in heavy metal dissolution, ammonia deodorization, and the like.

Accordingly, the natural zeolite according to the present invention is made by mixing the clinoptilolite and the mordenite or illite or by mixing the clinoptilolite, the mordenite, and the illite, to a given ratio after they are machined to given particle sizes, and next, cement and water are addedly bonded to the zeolite to thus manufacture the eco-friendly zeolite block for improving water quality.

In conclusion, the natural zeolite block according to the present invention is made using the characteristics of the natural zeolite and then built in water, thereby purifying the water polluted by means of pollutants, improving eutrophication in the water, and purifying all kinds of harmful substances and heavy metals melted in water to contribute to water quality improvement and ecosystem restoration.

BACKGROUND OF THE RELATED ART

A block for water purification is disclosed in Korean Patent No. 10-1959348, which is made of a composition obtained by mixing clinoptilolite, mordenite, and bentonite, but the conventional block is made by calcining the clinoptilolite, mordenite, and bentonite to a temperature of 300 to 400° C., pulverizing them to 200 to 400 mesh, and mixing them to a given ratio, so that energy cost occurrence and carbon dioxide emission may be caused and chemicals for treatment of oxidizing agents may be used, thereby failing to make an eco-friendly product. Further, the powder type particles are used, and upon molding, accordingly, sand is used as aggregate to bond the particles, so that the natural pores of the zeolite may be blocked by the sand to thus decrease consistent water quality improvement capability. In addition, the manufacturing cost may be raised, and above all, the functionality of the zeolite may be lost to thus give harms to environments.

SUMMARY OF THE INVENTION

Accordingly, the present invention has been made in view of the above-mentioned problems occurring in the related art, and it is an object of the present invention to provide a natural zeolite block that is capable of being built in rivers, streams, and reservoirs having point and non-point pollutant sources to purify the water polluted by pollutants, to remove the eutrophication in the water to prevent the occurrence of green and red tides, and to consistently purify heavy metals and all kinds of harmful substances flowing into the water and to a method for manufacturing the same.

To accomplish the above-mentioned objects, according to the present invention, there is provided a natural zeolite block for improving water quality, including a zeolite made by mixing clinoptilolite having the particles of given sizes and mordenite or illite having the particles of given sizes to a given ratio or by mixing clinoptilolite having the particles of given sizes and mordenite and illite each having the particles of given sizes to a given ratio wherein cement and water are added to the zeolite to make a mixture, and the mixture is molded as the natural zeolite block.

According to the present invention, desirably, the zeolite may be made by mixing 80 to 92 wt % of the clinoptilolite and 8 to 20 wt % of the mordenite with respect to the total weight of the zeolite of 100 wt %, by mixing 80 to 92 wt % of the clinoptilolite and 8 to 20 wt % of the illite with respect to the total weight of the zeolite of 100 wt %, or by mixing 80 to 90 wt % of the clinoptilolite, 5 to 10 wt % of the mordenite, and 5 to 10 wt % of the illite, and 12 to 15 wt % of cement and 10 to 15 wt % of water may be added to the total weight of the composed zeolite to make a mixture so that the mixture is put in a molding frame to manufacture the zeolite block.

According to the present invention, desirably, the zeolite is made by preparing 15 wt % of the clinoptilolite having the particles of sizes in the range of 8 to 10 mm, 45 wt % of the clinoptilolite having the particles of sizes in the range of 2.5 to 5 mm, 20 wt % of the clinoptilolite having the particles of sizes in the range of 1.2 to 2.4 mm, and 20 wt % of the clinoptilolite having the particles of sizes in the range of 0.5 to 1.2 mm.

According to the present invention, desirably, the zeolite is made by preparing 45 wt % of the mordenite having the particles of sizes in the range of 8 to 10 mm and 55 wt % of the mordenite having the particles of sizes in the range of 2 to 5 mm, and the illite having the particles of sizes in the range of 0.5 to 10 mm.

Figure 1:
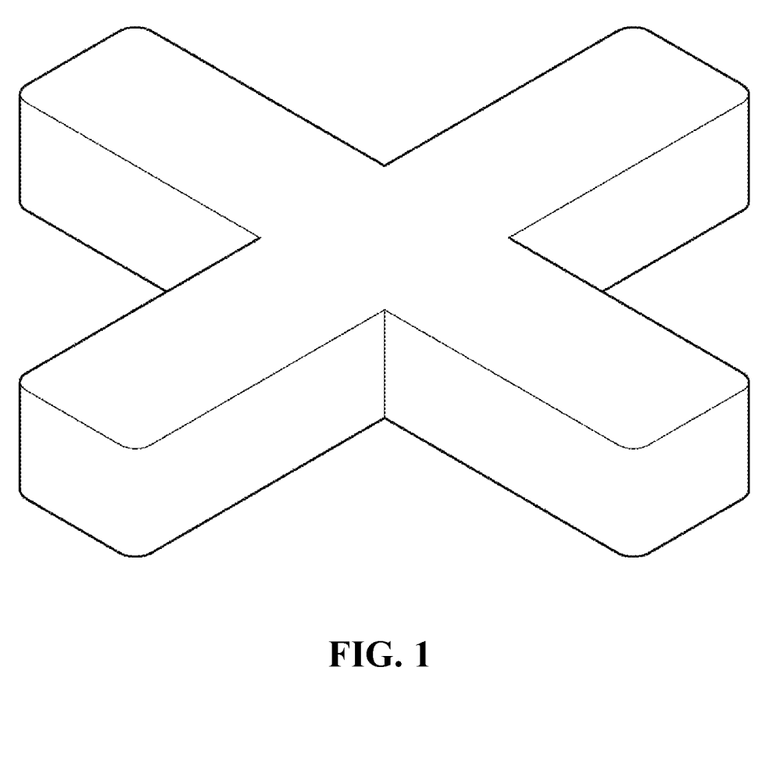
FIGS. 1 to 18 show a natural zeolite block with various shapes and sizes according to the present invention.
Figure 2:
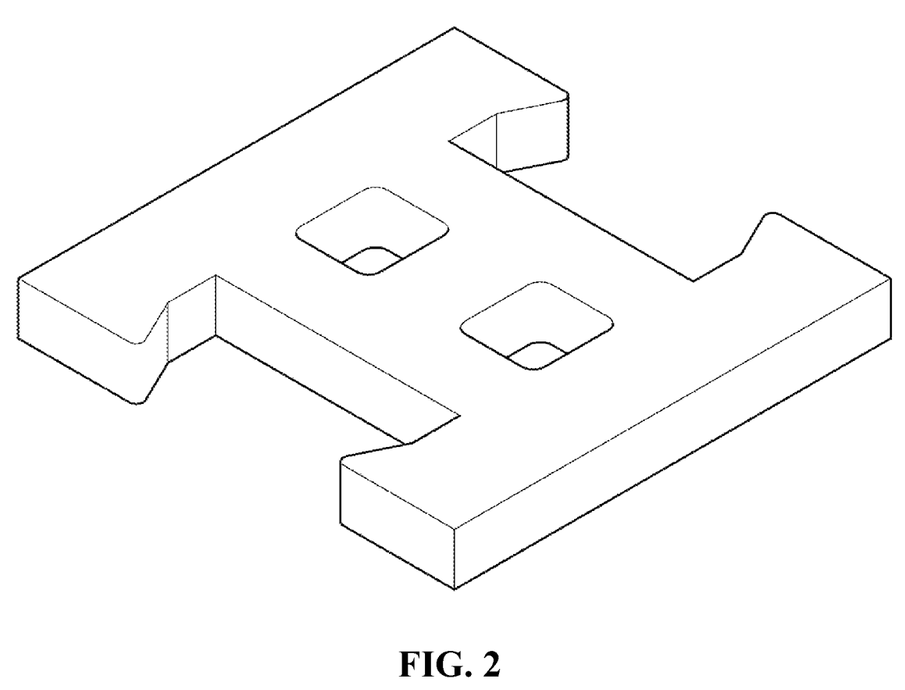
Figure 3:
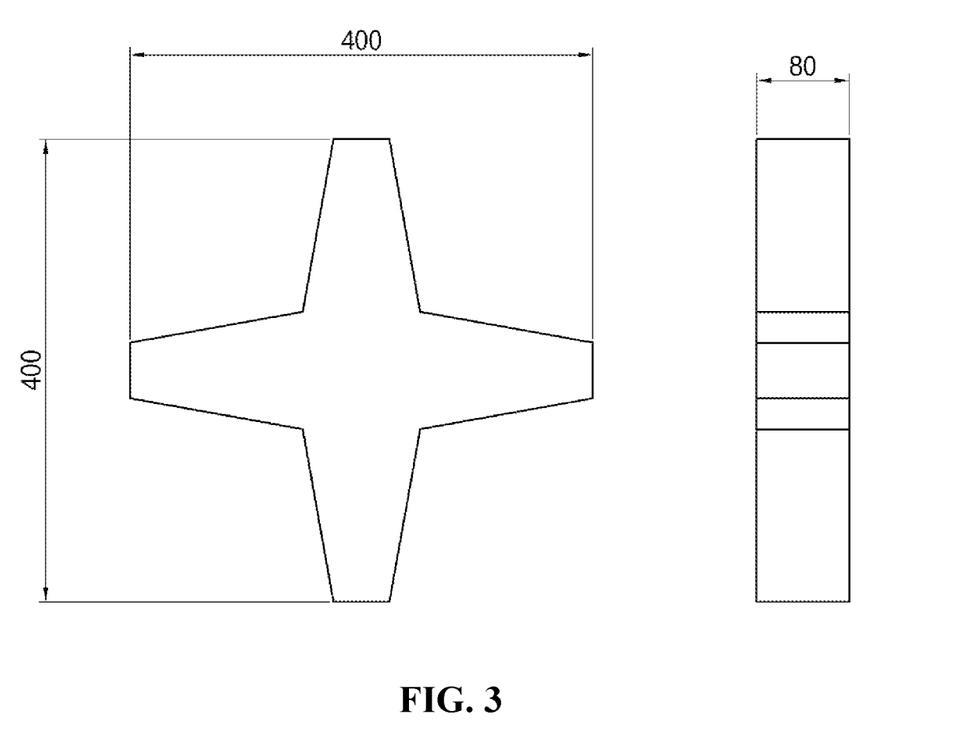
Figure 4:
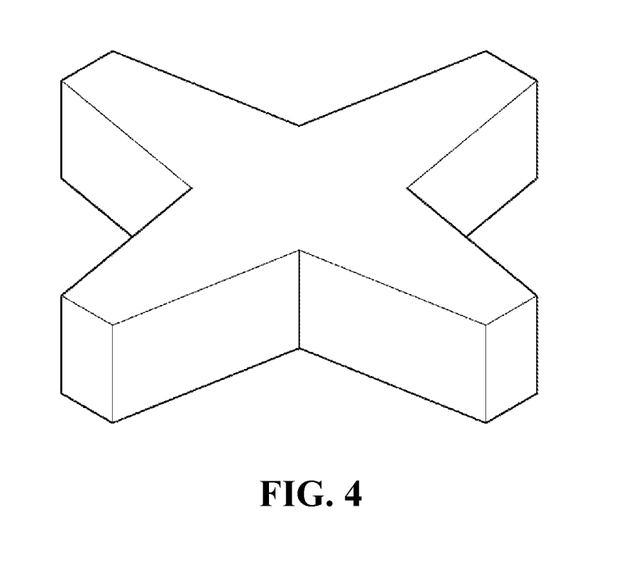
Figure 5:
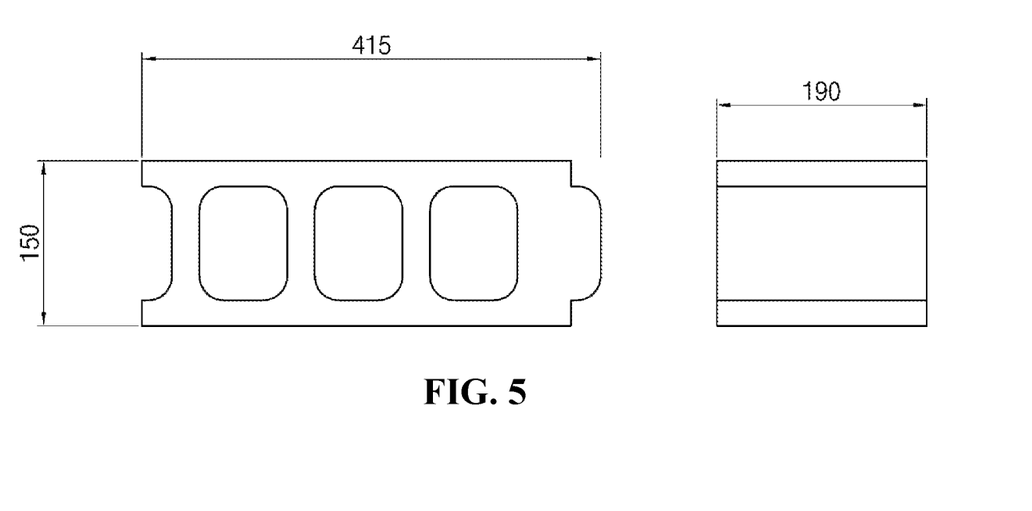
Figure 6:
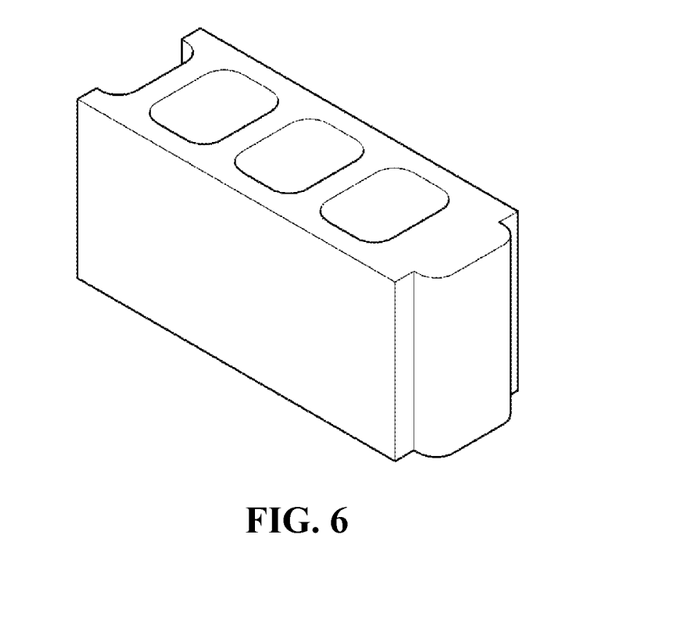
Figure 7:
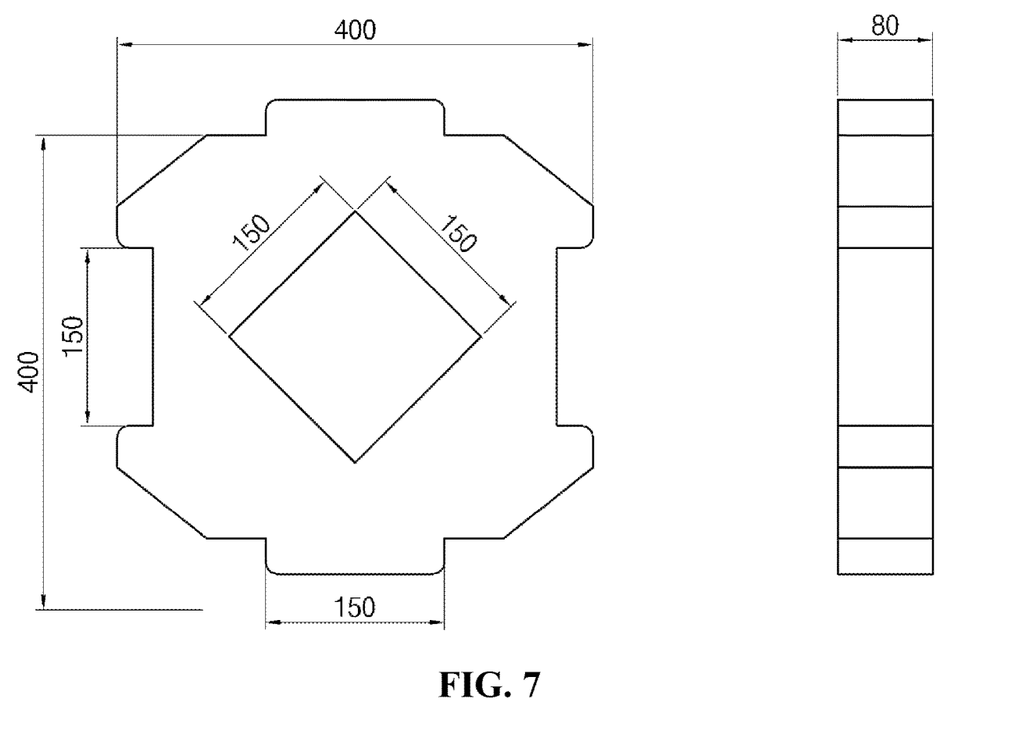
Figure 8:
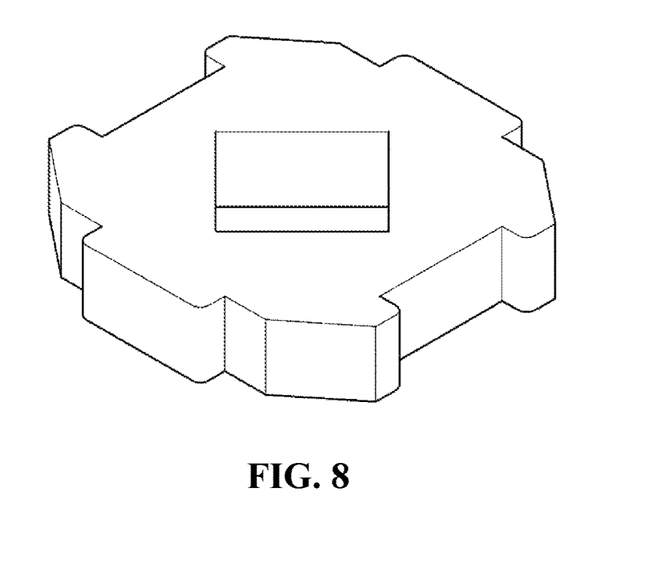
Figure 9:
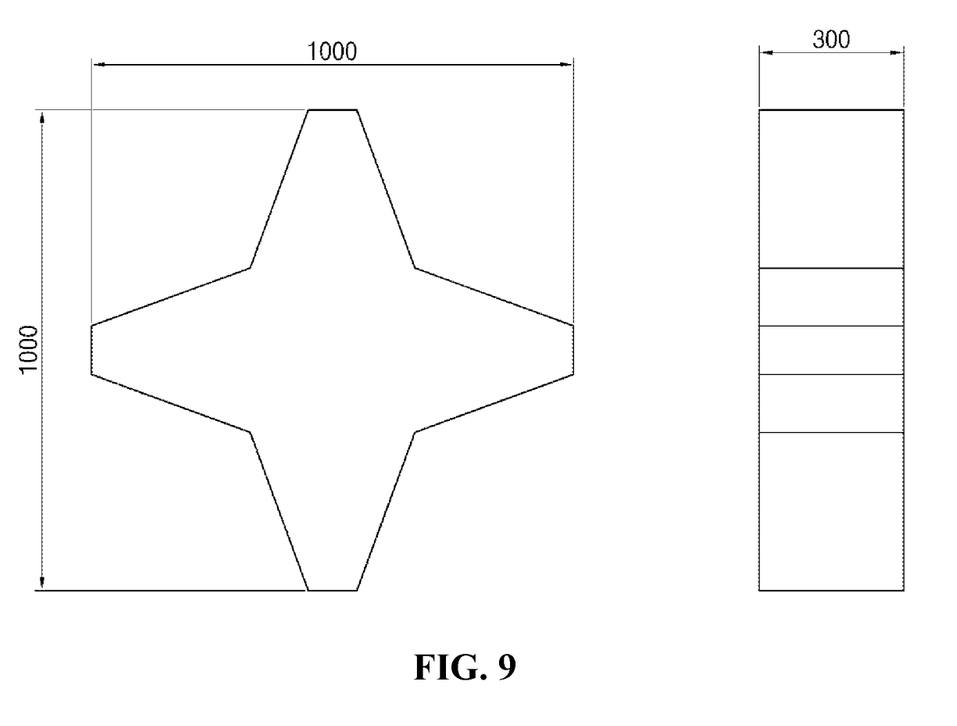
Figure 10:
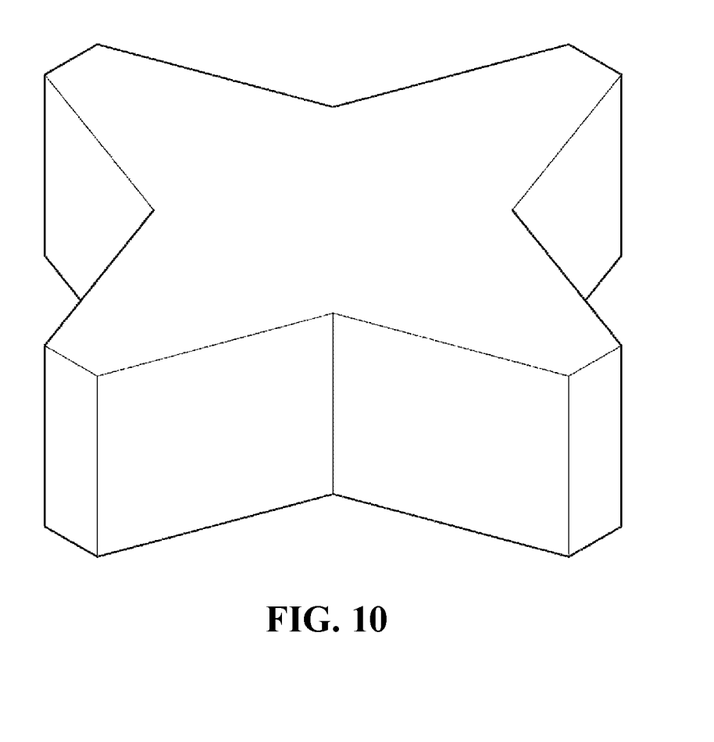
Figure 11:
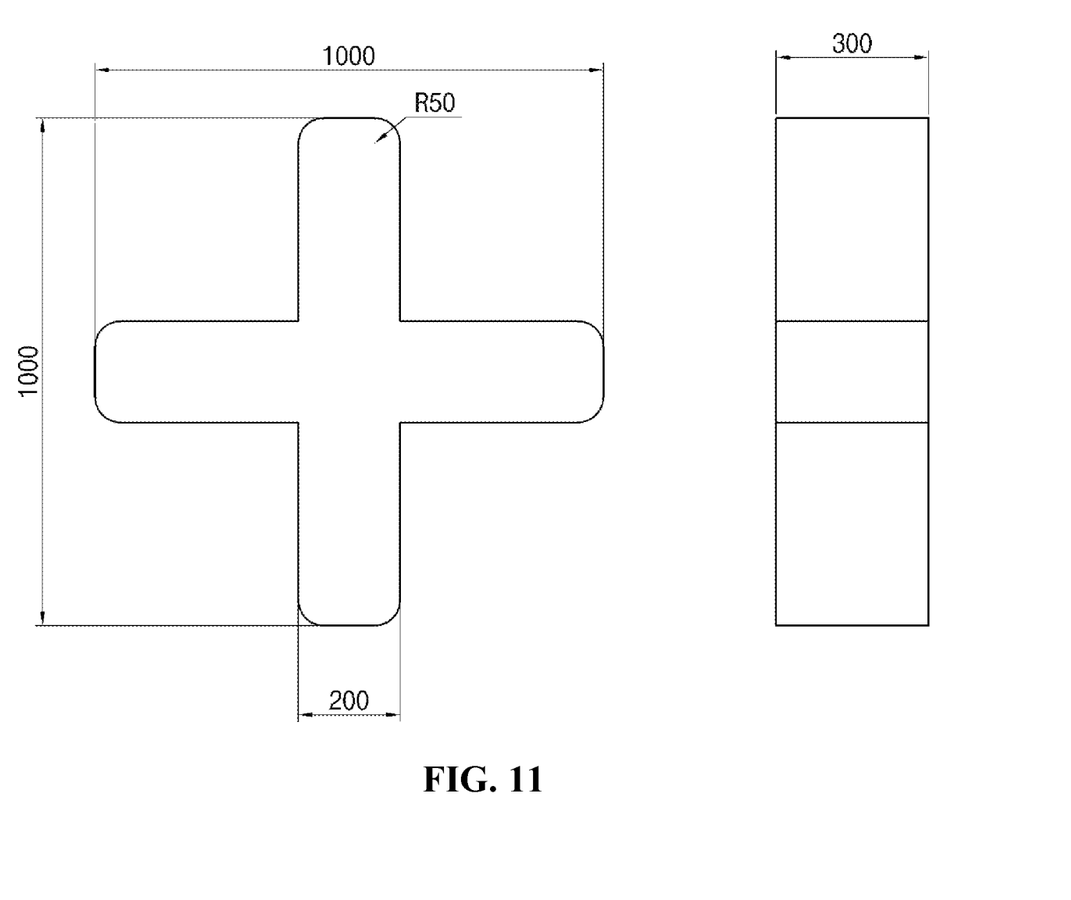
Figure 12:
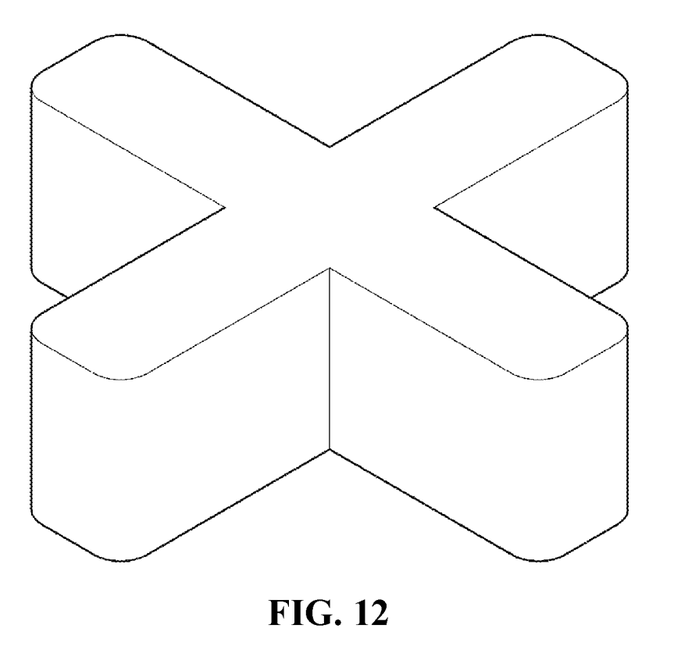
Figure 13:
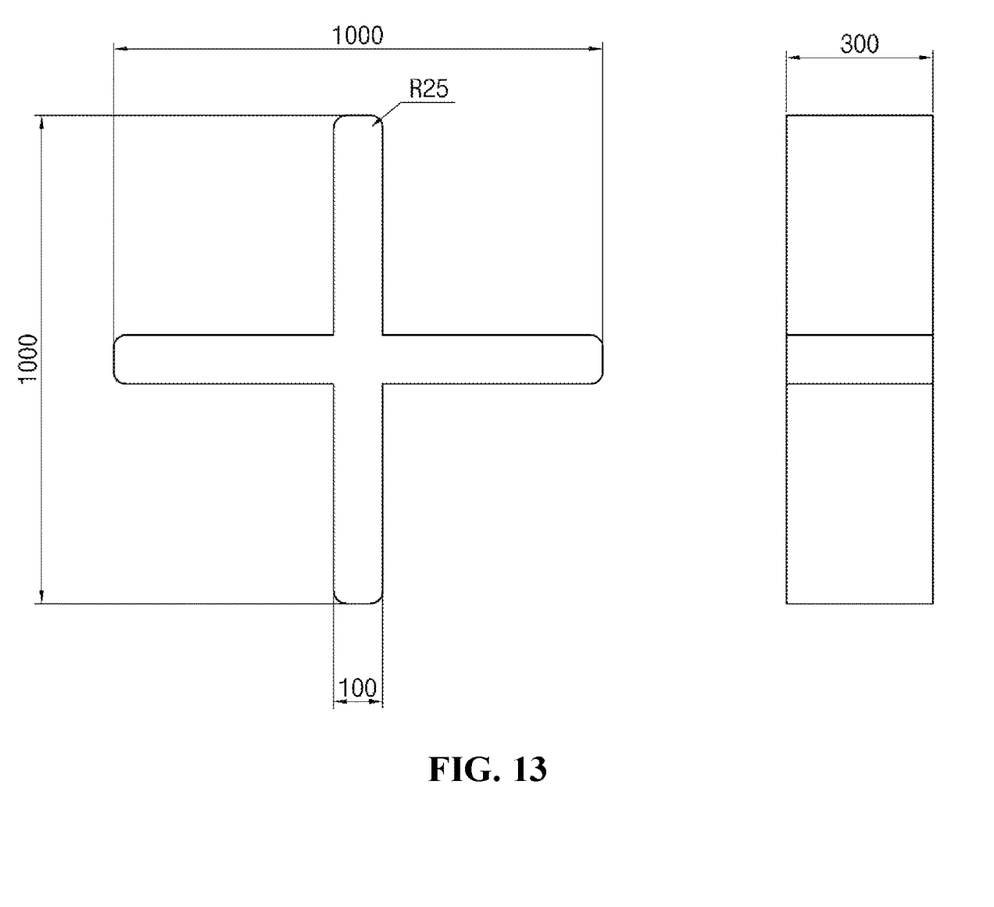
Figure 14:
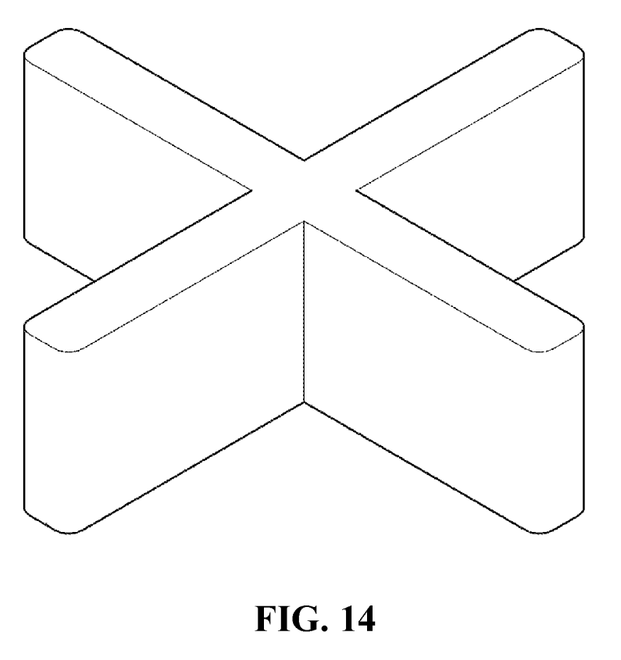
Figure 15:
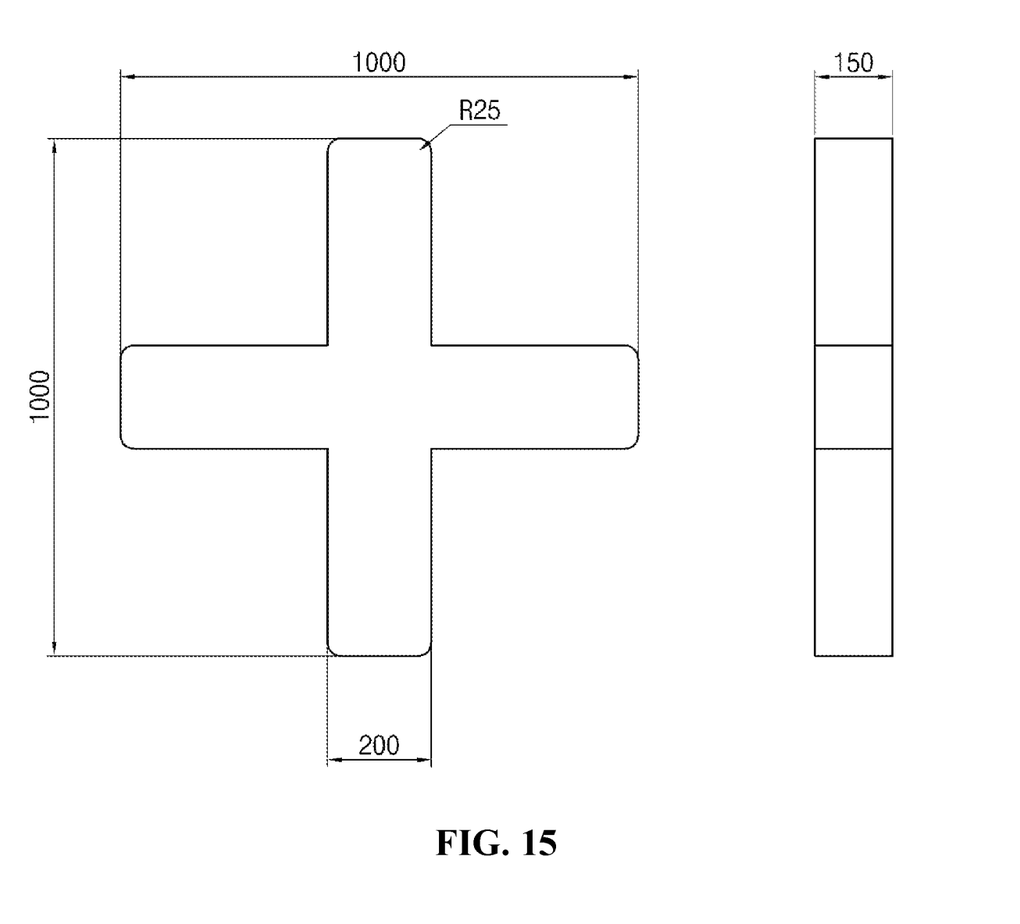
Figure 16:
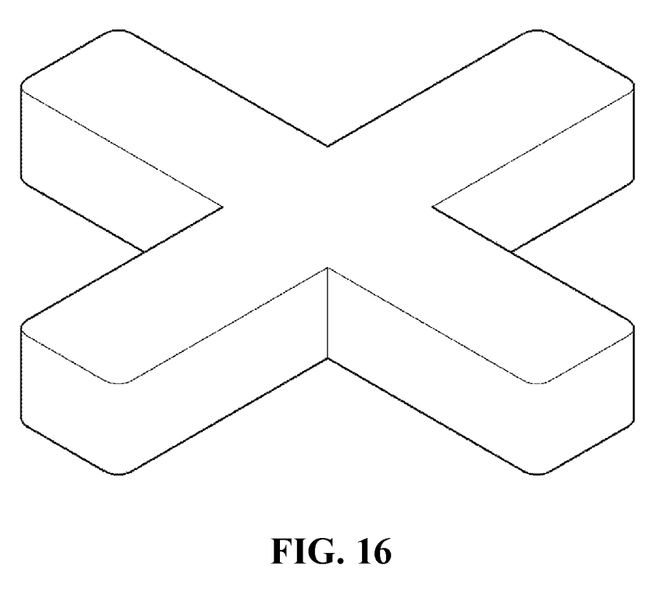
Figure 17:
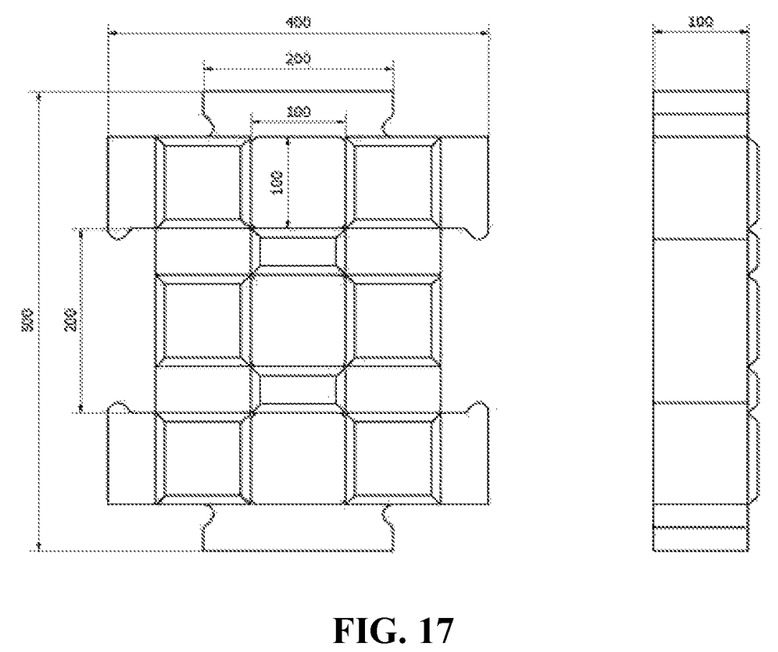
Figure 18:
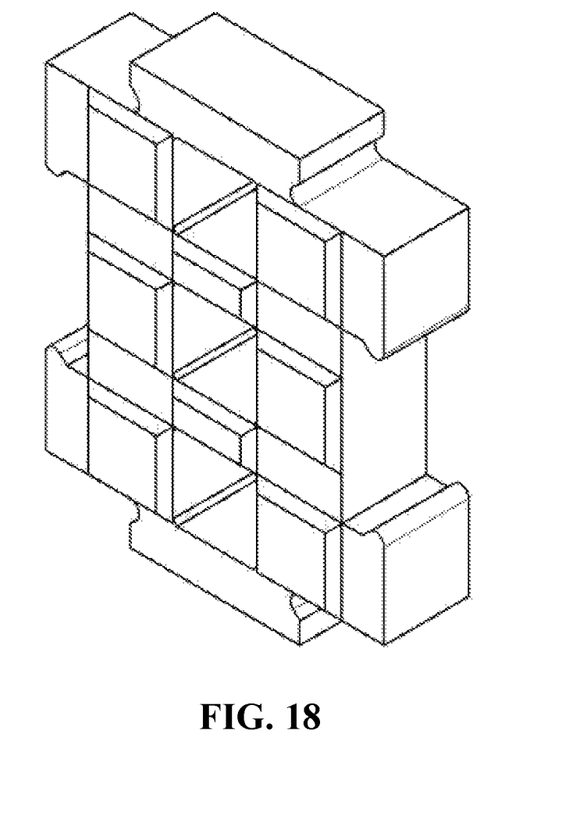

According to the present invention, desirably, the shapes and sizes of the zeolite block according to the present invention may be shown in FIGS. 1 to 18.

According to the present invention, desirably, the zeolite block according to the present invention may have hole(s) formed on a body thereof, an irregular main wall for expanding a surface area thereof, and concave and convex portions formed on top thereof to form a ford according to the flow of water.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

The present invention provides a zeolite block manufactured with specific components.

According to the present invention, a zeolite is made by mixing clinoptilolite and mordenite or illite to a given ratio or by mixing clinoptilolite, mordenite, and illite to a given ratio, and in this case, the mixing is performed after the particles of the minerals are machined to given sizes. Next, the minerals are bonded by water and cement, without any sand, thereby manufacturing the zeolite block according to the present invention.

With respect to the total 100 wt % of the zeolite, in specific, the zeolite is made by mixing 80 to 92 wt % of clinoptilolite having the particles of sizes in the range of 0.5 to 10 mm and 8 to 20 wt % of mordenite having the particles of sizes in the range of 2 to 10 mm, by mixing 80 to 92 wt % of clinoptilolite having the particles of sizes in the range of 0.5 to 10 mm and 8 to 20 wt % of illite having the particles of sizes in the range of 0.5 to 10 mm, or by mixing 80 to 90 wt % of clinoptilolite, 5 to 10 wt % of mordenite, and 5 to 10 wt % of illite, and next, 12 to 15 wt % of cement and 10 to 15 wt % of water are added to the total weight of the zeolite composition to thus make a mixture. The mixture is put into a frame and condensely molded through vibration and compression, thereby manufacturing the natural zeolite block with a given shape for improving water quality.

Further, the present invention provides a method for manufacturing a natural zeolite block, including the steps of: preparing 15 wt % of clinoptilolite having the particles of sizes in the range of 8 to 10 mm, 45 wt % of clinoptilolite having the particles of sizes in the range of 2.5 to 5 mm, 20 wt % of clinoptilolite having the particles of sizes in the range of 1.2 to 2.4 mm, and 20 wt % of clinoptilolite having the particles of sizes in the range of 0.5 to 1.2 mm; preparing 45 wt % of mordenite having the particles of sizes in the range of 8 to 10 mm and 55 wt % of mordenite having the particles of sizes in the range of 2 to 5 mm; preparing illite having the particles of sizes in the range of 0.5 to 10 mm; making a zeolite by selecting one method among various mixing methods in which when the total weight of the zeolite is 100 wt %, in the prepared materials, 80 to 92 wt % of clinoptilolite and 8 to 20 wt % of mordenite are mixed, 80 to 92 wt % of clinoptilolite and 8 to 20 wt % of illite are mixed, and 80 to 90 wt % of clinoptilolite, 5 to 10 wt % of mordenite, and 5 to 10 wt % of illite are mixed; adding 12 to 15 wt % of cement and 10 to 15 wt % of water with respect to the total weight of the made zeolite to make a mixture; putting the mixture in a frame with a given size disposed on a molding part of a block molding machine, applying 20 to 45 Hz vibrations to the mixture for three seconds and 50 Hz vibrations to the mixture for 20 seconds to forcedly condense the mixture in the frame, while applying 40 to 100 bar pressure to the mixture by means of a pressure plate; applying an air pressure to an upper frame by means of an air bag as an auxiliary pressure device to pressurizedly vibrate the mixture at 4 to 6 bar pressure, together with the application of the vibrations generated from vibration motors, so that while solidification difficulties caused by the physical properties of the lack of adhesion of mortar are being overcome, the natural zeolite block is manufactured; and removing the molded block from the frame and curing the block at a temperature of 25 to 30° C. for about one to two days.

Further, the natural zeolite block according to the present invention may be made to a variety of shapes, and it may have dimensions of length 500 mm×width 500 mm×depth 80 mm. However, of course, the zeolite block may have dimensions of length 1000 mm×width 1000 mm×depth 300 mm. In case of a single small-sized block, it may have a weight of 15 to 25 kg, and in case of a single medium-sized block, it may have a weight of 47 to 64 kg. In case of a single large-sized block, it may have a weight of 100 kg.

Moreover, each vibration motor used in the present invention is desirably a bottom vibration type three phase squirrel cage vibration motor that is varied to the range of 500 to 3600 RPM in tuning rotation speed of 3000 to 3600 RPM and the number of vibrations per minute of 2800 to 3400 and generates power up to 350 bar. In this case, the vibration motors are disposed on the corners of the frame to constantly tune the vibration amplitudes, thereby providing the vibrations required for the solidification to prevent defective products from being manufactured.

The zeolite block is made by bonding the filled materials through the smallest amount of cement to achieve the solidification of the zeolite, and as sand is not added, further, the zeolite block can become a product with natural adsorption functions, antibacterial functions, and underwater ecosystem conservation performance.

As described above, the natural zeolite block for improving water quality according to the present invention is composed of the zeolite made by mixing 80 to 92 wt % of the clinoptilolite having good positive ion exchangeability and 8 to 20 wt % of the mordenite having strong adsorption, by mixing 80 to 92 wt % of the clinoptilolite and 8 to 20 wt % of the illite having heavy metal adsorption, deodorization, and dissolution effectivenesses and ammonia deodorization effectiveness, or by mixing 80 to 90 wt % of the clinoptilolite, 5 to 10 wt % of the mordenite, and 5 to 10 wt % of the illite, thereby manufacturing a product capable of treating pollutants, maximizing the pores of the product through the different particle sizes of the minerals, condensely bonding the zeolite through the cement and water upon molding, without using any sand, to avoid environmental destruction caused by sand mining, and providing the natural functionality of the zeolite to achieve water quality improvement and water purification.

In addition, the natural zeolite block for improving water quality according to the present invention is composed of natural minerals, without any heating, thereby minimizing environmental destruction, and molded by putting the mixture into the molding frame through the condensation caused by the application of the vibration and pressure, thereby forming the pores to the maximum. In this case, if the zeolite block is made without any use of sand, it may come into contact with the pollutants and sediments to provide antibacterial and bacteriostatic activities and organic matter dissolution and purification activities, and accordingly, the zeolite block is more easily built than chips or powder and has more excellent effectiveness than the chips or powder. Further, the particle sizes of the minerals are sortedly selected to exert the functionality of the zeolite, and a variety of particle sizes of the minerals are provided to ensure high strength and cohesion and a maximum number of pores. The zeolite block can be built under water through various methods to provide beautiful underwater and waterside appearances and used to construct an optimized underwater structure having high affinity for aquatic animals and plants and their better living and propagation to thus contribute to consistent water quality improvement. In addition, the zeolite block is built on the bottom and side of a river to consistently suppress the dissolution of sediment layers through its own weight, thereby exerting ecosystem restoration functions and contributing to ecosystem restoration through economical water quality improvement and nature friendly activities.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for manufacturing a natural zeolite block, comprising the steps of:

preparing a clinoptilolite composition made by mixing 15 wt % of clinoptilolite having the particles of sizes in the range of 8 to 10 mm, 45 wt % of clinoptilolite having the particles of sizes in the range of 2.5 to 5 mm, 20 wt % of clinoptilolite having the particles of sizes in the range of 1.2 to 2.4 mm, and 20 wt % of clinoptilolite having the particles of sizes in the range of 0.5 to 1.2 mm with respect to the total weight of the clinoptilolite composition;

preparing a mordenite composition made by mixing 45 wt % of mordenite having the particles of sizes in the range of 8 to 10 mm and 55 wt % of mordenite having the particles of sizes in the range of 2 to 5 mm with respect to the total weight of the mordenite composition;

preparing an illite composition having the particles of sizes in the range of 0.5 to 10 mm;

making a mixture by mixing 80 to 92 wt % of the clinoptilolite composition and 8 to 20 wt % of the mordenite composition, mixing 80 to 92 wt % of the clinoptilolite composition and 8 to 20 wt % of the illite composition, or mixing 80 to 90 wt % of the clinoptilolite composition, 5 to 10 wt % of the mordenite composition, and 5 to 10 wt % of the illite composition with respect to the total 100 wt % of zeolite;

making a block material by mixing 12 to 15 wt % of cement and 10 to 15 wt % of water with respect to the total 100 wt % of the zeolite mixture;

putting the block material in a frame with a given size disposed on a molding part of a block molding machine, applying 20 to 45 Hz vibrations to the block material for three seconds and 50 Hz vibrations to the block material for 20 seconds to forcedly condense the block material in the frame, while applying 40 to 100 bar pressure to the block material by means of a pressure plate;

applying 4 to 6 bar pressure to the condensed material by means of an air bag as an auxiliary pressure device and applying auxiliary vibrations to the condensed material to bondedly solidify the condensed material; and removing a molded block from the frame and curing the block at a temperature of 25 to 30° C. for about one to two days.

* * * * *